United States Patent [19]

Davis

[11] Patent Number: 5,678,846
[45] Date of Patent: Oct. 21, 1997

[54] VEHICLE SUSPENSION DEVICE

[75] Inventor: John Peter Davis, Wymondham, United Kingdom

[73] Assignee: Lotus Cars Limited, Norfolk, United Kingdom

[21] Appl. No.: 500,875

[22] PCT Filed: Feb. 4, 1994

[86] PCT No.: PCT/GB94/00218

§ 371 Date: Oct. 20, 1995

§ 102(e) Date: Oct. 20, 1995

[87] PCT Pub. No.: WO94/18020

PCT Pub. Date: Aug. 18, 1994

[30] Foreign Application Priority Data

Feb. 4, 1993 [GB] United Kingdom ............ 9302152

[51] Int. Cl.$^6$ ............................................. B60G 11/26
[52] U.S. Cl. ............................................. 280/707; 280/714
[58] Field of Search ................................. 280/707, 709, 280/714

[56] References Cited

U.S. PATENT DOCUMENTS

| | | | |
|---|---|---|---|
| 5,082,308 | 1/1992 | Jones | 280/714 |
| 5,102,161 | 4/1992 | Williams | 280/707 |
| 5,290,048 | 3/1994 | Takahashi et al. | 280/714 |
| 5,348,338 | 9/1994 | Kuriki et al. | 280/714 |

FOREIGN PATENT DOCUMENTS

| | | |
|---|---|---|
| 0 371 709 A1 | 6/1990 | European Pat. Off. . |
| 4136813 A1 | 5/1992 | Germany . |
| 2182527 | 7/1990 | Japan . |
| WO 91/07290 | 5/1991 | WIPO . |
| WO 92/13731 | 8/1992 | WIPO . |

*Primary Examiner*—Paul N. Dickson
*Attorney, Agent, or Firm*—Westman, Champlin & Kelly, P.A.

[57] ABSTRACT

The invention provides a vehicle suspension device comprising an actuator (10) having a piston (11) and a plurality of chambers (A and B), a source of pressurized fluid (21), an exhaust for pressurized fluid (24), a first sensor (34) senses the force applied to the actuator (10), a second sensor (35) senses the pressure of the fluid supplied by the source of pressurized fluid (21) and a controller (23,27) controls the extension of the actuator (10) by controlling the flow of fluid to and from at least one of the chambers (A, B), the controller (27) receives signals from the first (34) and second (35) sensors and controls the actuator accordingly. The controller (23,27) connects the chamber (A) to the source of pressurized fluid (21) when the controller (27) determines that a force applied to the actuator is a) greater than the force that can be applied to the piston (11) by the greatest achievable difference in pressures acting on the surfaces thereof, b) acting to expel fluid from the chamber (A) and c) acting to assist the piston (11) in attaining the velocity required by the controller (27).

8 Claims, 1 Drawing Sheet

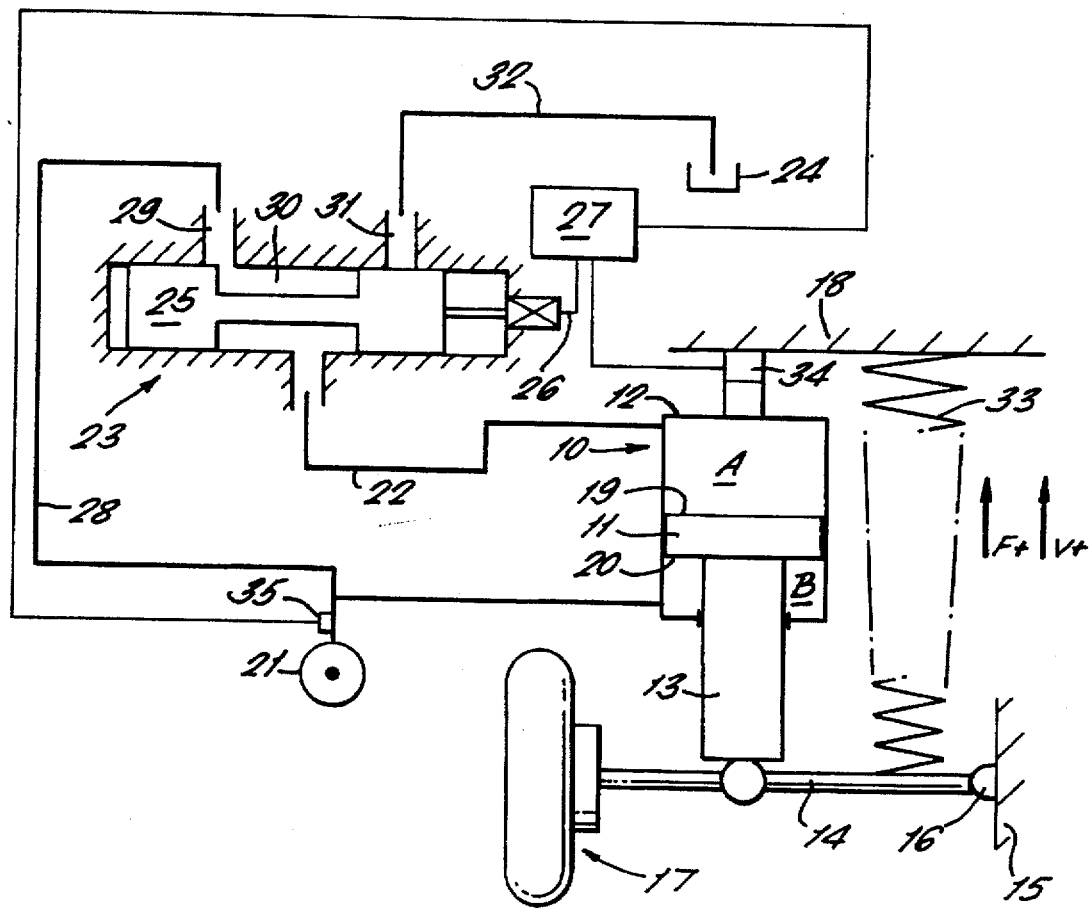

VEHICLE SUSPENSION DEVICE

BACKGROUND OF THE INVENTION

The present invention relates to a vehicle suspension device.

The present invention relates particularly to a vehicle suspension device for use in a vehicle suspension system wherein actuators are used between the wheel and hub assemblies of the vehicle to control the relative position of the wheel and hub assemblies with respect to the vehicle body. The actuators generally comprise hydraulic piston and cylinder arrangements. An example of such a vehicle suspension system is disclosed in European patent EP 0114757.

When hydraulically powered actuators are used in a vehicle suspension system, the power used by the actuators is generally provided by the engine of the vehicle. Any power taken from the engine of the vehicle detracts from the engine performance and economy. Therefore it is important that the actuator should use as little power as possible during operation. This is especially important when the vehicle is passing over very rough ground and the actuators are required to make many rapid movements. In fact, if the actuators require too much power, the pressure of the fluid within the system may fall since the source of pressurized fluid within the system may not be able to provide sufficient fluid to meet the demand of the actuator. In such circumstances, the active suspension system ceases to function properly, being not able to adequately control the motion of each actuator.

SUMMARY OF THE INVENTION

The present invention provides a vehicle suspension device comprising: an actuator having a piston and a plurality of chambers, a source of pressurized fluid, an exhaust for pressurized fluid, first sensor means for sensing the force applied to the actuator, second sensor means for sensing the pressure of the fluid supplied by the source of pressurized fluid, and control means for controlling the extension of the actuator by controlling flow of fluid to and from at least one of the chambers, which control means receives signals from the first and the second sensor means and controls the actuator accordingly, wherein;

the control means connects the said chamber to the source of pressurized fluid when the control means determines that the force applied to the actuator is;

greater than the force that can be applied to the piston by the greatest achievable difference in pressures acting on the surfaces thereof, acting to expel fluid from the said chamber, and acting to assist a piston in attaining a velocity required by the control means.

Preferably the control means locks the actuator by preventing fluid from flowing into or out of the said first chamber when the control means determines that force applied to the actuator is;

greater than the force that can be applied to the piston by the greatest achievable difference in pressures on the surfaces thereof, and acting to force the piston in a direction opposite to the direction of the velocity required of the piston by the control means.

The control means connects the said chamber to the exhaust for pressurised fluid when the control means determines that the force applied to the actuator is;

greater than the force that can be applied to the piston by the greatest achievable difference in pressure on the surfaces thereof, acting to induce fluid into the said first chamber, and acting to aid the piston in obtaining the velocity required by the control means.

Preferably the control device comprises a processor and a valve means controlled by the processor, the valve means being connected to the said chamber, the source of pressurized fluid and the exhaust for pressurized fluid, and the valve means metering the flow of fluid to and from the first chamber.

Preferably the valve means comprises a spool member movable within a housing to open and close apertures defined in the housing, the movement of the spool member being controlled by the processor.

In one preferred embodiment the actuator comprises a first and a second chamber, the surface of the piston acting in the first chamber is larger than the surface of the piston acting in the second chamber, the control means controls flow of fluid into and out of the first chamber and the second chamber is permanently arranged for connection to the source of pressurized fluid.

The invention also provides an active suspension for a vehicle comprising a vehicle suspension device as hereinbefore described arranged for connection between the sprung mass of the vehicle and a wheel and hub assembly thereof. Preferably the vehicle suspension device is connected between the sprung mass of the vehicle and the wheel and hub assembly in parallel with a road spring.

BRIEF DESCRIPTION OF THE DRAWINGS

The accompanying drawing shows a schematic representation of a vehicle suspension device according to the invention.

DETAILED DESCRIPTION OF THE PREFERRED EMBODIMENTS

The present invention will be discussed in relation to an "unequal" actuator. However, the present invention could be used with any form of hydraulic actuator. An "unequal" area actuator is an actuator which employs a piston and cylinder arrangement wherein one surface of the piston acting in the cylinder is of greater area than the other surface of the piston acting within the cylinder. Commonly, the side of the piston of smaller surface area is permanently attached to a source of pressurised fluid and the flow of fluid to and from the larger surface area is metered by a control valve. Such an equal area actuator is disclosed in the applicants previous European Application Publication No. 0371709.

Referring to the accompanying drawing, the vehicle suspension device can be seen to comprise an actuator 10 with a piston 11 acting within a cylinder 12. The piston 11 is attached to an arm 13 which is pivotally connected to a suspension arm 14 which is in turn pivotally connected to the vehicle body shown at 15, by a pivot joint 16. The suspension arm 14 carries on it a wheel and hub assembly 17. The cylinder 12 is attached to the vehicle body at 18. Movement of the piston 11 with respect to the cylinder 12 causes associated motion of the vehicle suspension arm 14 and thereby the wheel and hub assembly 17. A road spring 33 is connected in parallel with the actuator 10 to act between the suspension arm 14 and the vehicle body 18.

The piston 11 within the cylinder 12 has two sides 19 and 20. Side 19 is of greater surface area than side 20. The side 19 acts within the chamber A defined between the piston and the cylinder, whilst the side 20 acts in a chamber B defined between the piston and the cylinder 12. The surface of the side 20 is necessarily smaller than the surface area than the side 19 since the arm 13 extends from the side 20 longitudinally along the cylinder 12 and out of an aperture defined in the bottom thereof.

The chamber B is permanently connected to a source of pressurized fluid 21. The chamber A is connected by a line 22 to valve means 23. The valve means 23 comprises a three port servo-valve, one port being connected to the source of pressurized fluid 21, a second port being connected to an exhaust for pressurised fluid 24 and a third port being connected via the line 22 to the chamber A.

The valve means 23 comprises a spool member 25 which is controlled to move within the surrounding casing by electrical control signals received via line 26 from a control processor 27. The processor 27 is connected to a load cell 34 which measures the force F on the actuator 10. The processor 27 is also connected to a pressure sensor 35 which measures the pressure Ps of the supply of pressurized fluid. The processor is a part of a vehicle active suspension control system.

In the position shown the spool member 25 allows some flow of fluid from the source of pressurized fluid 21 through the line 28, the inlet 29 and through the annular aperture 30 defined in the spool valve to the line 22 and thereby to the chamber A. If the spool member 25 moves to the left of its position shown in FIG. 1 then a greater flow of fluid is allowed to pass from the source of pressurized fluid 21 to the chamber A and therefore the velocity of the piston 11 is greater. If the spool member 30 moves to the right of its position shown in FIG. 1 then a decreasing flow of fluid is allowed to pass from the source of pressurized fluid 21 to the chamber A and therefore the piston moves more slowly the nearer the spool member 25 approaches the point at which the inlet 29 is sealed off.

At the point at which the inlet 29 is sealed off, the line to the exhaust for pressurized fluid is also sealed off. Therefore in the central position no fluid is allowed to flow into or out of the chamber A.

Once the spool member 25 has moved beyond the central position to the right of the position shown in FIG. 1, then the chamber A is connected via the line 22 and the annular aperture 30 to the outlet 31 and then by line 32 to the exhaust for pressurized fluid 24. As the spool member 25 moves further to the right after uncovering the outlet 31, then a greater flow of fluid is allowed out of the chamber A to the exhaust 24.

By controlling the flow of fluid into and out of the chamber A the valve 23 controls the velocity of the piston 11 with respect to the cylinder 12.

When the chamber A is connected to the exhaust for pressurised fluid then the pressure of the fluid within the chamber A is zero. The pressure in chamber B is always Ps, the supply pressure, that is to say the pressure of the fluid supply from the source of pressurized fluid 21. If the area of the surface 20 is B1 then the total upward force on the piston 11 is B1×Ps.

The surface area A1 of the side 19 of the piston 10 is chosen generally to be twice the area B1 of the side 20 of the piston 11 (A1=2*B1). Therefore when the chamber A is connected to the source of pressurised fluid 21 there is a net downward force of −Ps*B1.

In the description there will be adopted a sign convention wherein forces and velocities in the direction of the arrows shown in FIG. 1 are positive, whilst forces of velocities in the opposite direction are negative.

In the normal method of operation the vehicle suspension device meters fluid into chamber A from the source of pressurized fluid 21 if the processor 27 requires a negative velocity of piston 19. The vehicle suspension device meters fluid out of chamber A to the exhaust for pressurised fluid 24 if a positive velocity is required of the piston 11 by the processor 27.

As described above, the vehicle suspension device of the present invention operates in the same manner as the vehicle suspension devices of the prior art. However, the applicants have appreciated that such a system suffers when the vehicle is passing over very rough ground, since the supply of fluid from the source of pressurized fluid is limited and the rapid movements required of the piston 11 by the control processor have tended to reduce the system pressure and severely affect the operating characteristics of the system.

In view of this disadvantage of the prior art, the applicants have devised a method by which system pressure Ps can be maintained at a reasonable level whilst the vehicle passes over very rough ground.

Accordingly, the applicants have altered the control logic of the processor 27 so that the valve 23 only operates in normal fashion, as described above, when the following condition is satisfied:

TEST CONDITION A $$ABS(Ps*(A1-B1)) > ABS\ F$$

where ABS indicates absolute value

Ps=system pressure

A1=area of the side of the piston with largest surface area

B1=area of the side of the piston with smallest surface area

F=force applied to piston by virtue of reaction of associated wheel and hub assembly with the road This equation is only valid for systems wherein the surface area A1 is twice the surface area of B1. For different ratios then two equations will be necessary to ascertain when the force that can applied across the piston of the actuator by the difference in pressure is less than the external force F applied to the actuator.

From the equation of test condition A it can be seen that the vehicle suspension device (with A1=2*B1) only operates in the normal mode hereinbefore described when the product of the system pressure Ps and the difference in area between the two sides of the piston 11 is greater than the absolute value of the force applied to the piston 11 by virtue of reaction of the wheel and hub assembly 17 with the ground. When the force on the actuator due to the force on the wheel and hub assembly exceeds the absolute value of the product of the system pressure and difference in piston surface areas then the control processor 27 obeys the following logic;

TABLE 2

| OPERATING CONDITION | FORCE | DESIRED VELOCITY | COMMAND SIGNAL TO VALVE MEANS |
|---|---|---|---|
| 1) | +ve | +ve | meter flow of fluid out of chamber A to the source of pressurized fluid |

TABLE 2-continued

| OPERATING CONDITION | FORCE | DESIRED VELOCITY | COMMAND SIGNAL TO VALVE MEANS |
|---|---|---|---|
| 2) | −ve | +ve | lock-actuator; do not allow fluid to flow into or out of chamber A |
| 3) | +ve | −ve | lock actuator; do not allow fluid to flow into or out of chamber A |
| 4) | −ve | −ve | meter flow of fluid into chamber A from the exhaust |

From the above table it can be seen that when the absolute value of F exceeds the absolute value of the product of Ps and the difference in surface areas of the piston, then the control processor 27 controls the valve means 23 in four different operating conditions.

In the first operating condition both the force F and the velocity required of the piston 11 by the processor 27 are positive. In other words, the processor 27 requires the piston 11 to move upwardly within the cylinder 12, whilst the force F also forces the piston 11 to do so. In this circumstance, the processor 27 meters the flow of fluid out of chamber A to the line 28 and thereby to the source of pressurized fluid 21. In this way, the processor 27 turns the actuator 10 into a pump, pressurizing the system and increasing the system pressure Ps. When the system pressure Ps reaches a stage at which Test Condition A is satisfied then the processor 27 reverts to controlling the actuator 10 in the normal manner hereinbefore described (connecting chamber A to the exhaust 24 if a positive velocity is required or to the source 21 if a negative velocity is required).

In either of the second and third conditions the desired velocity required of the piston 11 by the processor 27 is in the opposite sense to the force F whilst the force F is greater than the product of the system pressure and difference in surface areas of the piston. In these conditions the control processor 27 acts to "lock" the actuator. In other words, the control processor 27 causes the valve means 23 to assume the central position in which fluid is not allowed to flow in or out of the chamber A. Unfortunately, in this condition the force F is directly transmitted to the vehicle body at 18, but the condition is preferable to having a situation in which the actuator is uncontrolled because the force F on the actuator is greater than the force that can applied on the piston 11 by the vehicle suspension device to oppose the force F.

In the fourth condition of the vehicle suspension device according to table 2 the force on the piston 11 and the desired velocity required of the piston 11 by the processor 27 are both negative. Fluid must be introduced into the chamber A to allow the piston 11 to achieve a negative velocity. The valve means 23 conserves the pressurized fluid available from the source of pressurized fluid 21 and meters the flow of fluid into the chamber A from the exhaust for pressurised fluid 24. The exhaust for pressurized fluid 24 is commonly a sump of fluid. Fluid is drawn from the sump in the condition 4 to supply the chamber A. Hence the work on the piston 11 is carried out by the force F, whilst the valve 23 restricts the flow to ensure that the piston 11 has the required velocity. Since the piston 11 is forced in the negative direction by the force F, the fluid within chamber B is pressurized and this increases the system pressure Ps. Eventually, when the system pressure Ps increases to a level in which test condition A above is satisfied then the processor 27 reverts to controlling the actuator 10 in the normal manner previously described.

By operating in the manner described above the vehicle suspension device can turn itself into a pump to pressurise the system when the system pressure Ps falls to a low level. Therefore the system can be kept "alive" whilst the vehicle is moving over very rough ground and large flow demands into the chambers of the actuator are required.

As mentioned above the equation shown as test condition A is only valid for an actuator in which A1=2*B1. If different ratios are used then the processor must apply a further test condition B in addition to test condition A. If F is positive then the processor will only operate the valve 23 in normal fashion if ABS Ps(A1−B1)>ABS F (test condition A). If F is negative then the processor will only operate the valve in normal fashion if ABS Ps*B1>ABS F (test condition B). The operating conditions 1 to 4 shown in Table 2 remain the same for operation of the valve when either test condition A or test condition B is not satisfied.

If the vehicle suspension device of the invention comprises an actuator with a piston of surface areas equal to one another then only one test condition need be applied. The maximum force on the "equal area" piston arises when one chamber is connected to system pressure and the other to exhaust, the resultant force being Ps*A2 (Ps is system pressure and A2 is the area of either side of the piston). The processor controlling the actuator will operate in the normal manner as long as Ps*A2 is greater than the external force applied to the actuator, otherwise the processor will operate in one of the operating conditions in Table 2.

It is evident from the foregoing that the vehicle suspension device of the present invention is an improvement over the prior art since it provides a system wherein the actuators themselves can be turned used to pressurise the fluid within the vehicle suspension system, thus preventing the pressure of the fluid within the system from falling to a level at which the actuators are largely uncontrolled.

I claim:

1. A vehicle suspension device comprising:
   an actuator having a piston and a plurality of chambers,
   a source of pressurized fluid,
   an exhaust for pressurised fluid,
   first sensor means for sensing a force applied to the actuator,
   second sensor means for sensing the pressure of the fluid supplied by the source of pressurized fluid, and
   control means for controlling the extension of the actuator by controlling flow of fluid to and from at least one of the chambers, which control means receives signals from the first and the second sensor means and controls the actuator accordingly, wherein;
   the control means connects said at least one chamber to the source of pressurized fluid when the control means determines that the force applied to the actuator is;
   greater than the pressurized fluid force that can be applied to the piston by the greatest achievable difference in pressurized fluid pressures acting on opposite surfaces of the piston,
   acting to expel fluid from said at least one chamber, and
   acting to assist the piston in attaining a velocity required by the control means.

2. A vehicle suspension device as claimed in claim 1 wherein the control means locks the actuator by preventing fluid from flowing into or out of said at least one chamber when the control means determines that the force applied to the actuator is;

greater than the pressurized fluid force that can be applied to the piston by the greatest achievable difference in pressurized fluid pressures on opposite surfaces of the piston, and acting to force the piston in a direction opposite to the direction of the velocity required of the piston by the control means.

3. A vehicle suspension device as claimed in claim 1 wherein the control means connects said at least one chamber to the exhaust for pressurised fluid when the control means determines that the force applied to the actuator is;

greater than the pressurized fluid force that can be applied to the piston by the greatest achievable difference in pressurized fluid pressures on opposite surfaces of the piston, acting to induce fluid into said at least one chamber, and acting to aid the piston in obtaining the velocity required by the control means.

4. A vehicle suspension device as claimed in claim 1 wherein the control device comprises a processor and a valve means controlled by the processor, the valve means being connected to said at least one chamber, the source of pressurized fluid and the exhaust for pressurized fluid, and the valve means metering the flow of fluid to and from said at least one chamber.

5. A vehicle suspension device as claimed in claim 4 wherein the valve means comprises a spool member movable within a housing to open and close apertures defined in the housing, the movement of the spool member being controlled by the processor.

6. A vehicle suspension device as claimed in claim 1 wherein the actuator comprises a first and a second chamber, a piston surface acting in the first chamber being larger than a piston surface acting in the second chamber, the control means controls flow of fluid into and out of the first chamber and the second chamber is permanently connected to the source of pressurised fluid.

7. An active suspension in an automobile comprising a vehicle suspension device as claimed in claim 1 connected between a sprung mass of the vehicle and a wheel and hub assembly thereof.

8. An active suspension as claimed in claim 1 wherein the vehicle suspension device is connected between the sprung mass of the vehicle and the wheel and hub assembly in parallel with a road spring.

* * * * *

UNITED STATES PATENT AND TRADEMARK OFFICE
CERTIFICATE OF CORRECTION

PATENT NO. : 5,678,846
DATED : October 21, 1997
INVENTOR(S) : John P. Davis et al.

It is certified that error appears in the above-indentified patent and that said Letters Patent is hereby corrected as shown below:

Claim 8, line 1, cancel "1" and insert --7--.

Signed and Sealed this

Fourth Day of August, 1998

Attest:

BRUCE LEHMAN

*Attesting Officer*  *Commissioner of Patents and Trademarks*